United States Patent
Lee et al.

(10) Patent No.: US 10,671,534 B2
(45) Date of Patent: Jun. 2, 2020

(54) METHOD FOR CONTROLLING DEVICE INCLUDING AT LEAST ONE MEMORY, AND SMART TV

(71) Applicant: LG ELECTRONICS INC., Seoul (KR)

(72) Inventors: Gunho Lee, Seoul (KR); Baeguen Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 157 days.

(21) Appl. No.: 15/527,803

(22) PCT Filed: Dec. 11, 2014

(86) PCT No.: PCT/KR2014/012212
§ 371 (c)(1),
(2) Date: May 18, 2017

(87) PCT Pub. No.: WO2016/080580
PCT Pub. Date: May 26, 2016

(65) Prior Publication Data
US 2018/0349281 A1    Dec. 6, 2018

(30) Foreign Application Priority Data
Nov. 18, 2014  (KR) .................. 10-2014-0160640

(51) Int. Cl.
*G06F 12/00*    (2006.01)
*G06F 12/0842*  (2016.01)
(Continued)

(52) U.S. Cl.
CPC ...... *G06F 12/0842* (2013.01); *G06F 11/1446* (2013.01); *H04N 21/4184* (2013.01);
(Continued)

(58) Field of Classification Search
CPC .......... H04N 21/4334; H04N 21/4147; H04N 21/42222; H04N 21/4325; H04N 21/4826;
(Continued)

(56) References Cited

U.S. PATENT DOCUMENTS

| 5,910,987 A * | 6/1999 | Ginter ............ G06F 21/10 |
| | | 348/E5.006 |
| 2009/0259789 A1* | 10/2009 | Kato ............ G06F 13/28 |
| | | 710/308 |
| 2018/0089091 A1* | 3/2018 | Akenine-Moller ....... G06T 1/60 |

FOREIGN PATENT DOCUMENTS

| JP | 2009-020555 | 1/2009 |
| KR | 10-2012-0079457 | 7/2012 |

(Continued)

OTHER PUBLICATIONS

Korean Office Action dated Sep. 22, 2015 issued in Application No. 10-2014-0160640.
(Continued)

*Primary Examiner* — Ramon A. Mercado
*Assistant Examiner* — Tahilba O Puche
(74) *Attorney, Agent, or Firm* — Ked & Associates LLP

(57) ABSTRACT

Disclosed are a method for controlling a device including at least one memory, and a smart TV. The method comprises the steps of: receiving, from a remote controller, a signal for executing at least one application; outputting video data and audio data of the executed application; temporarily storing the executed application in an internal memory; swapping, to an external memory, a page corresponding to a specific application of the at least one application stored in the internal memory; and displaying information on the application swapped to the external memory.

11 Claims, 17 Drawing Sheets

(51) Int. Cl.
*H04N 21/443* (2011.01)
*H04N 21/47* (2011.01)
*G06F 11/14* (2006.01)
*H04N 21/418* (2011.01)
*H04N 21/426* (2011.01)

(52) U.S. Cl.
CPC ..... *H04N 21/42669* (2013.01); *H04N 21/443* (2013.01); *H04N 21/47* (2013.01); *H04N 21/42653* (2013.01)

(58) Field of Classification Search
CPC ....... H04N 21/44204; H04N 21/44222; H04N 21/458; H04N 21/4668; H04N 21/4335; H04N 21/4184; H04N 21/42653; H04N 21/42669; H04N 2201/0072; H04N 1/2376; H04N 1/2158; H04N 1/00925; H04N 2201/0087; G06F 12/0842; G06F 3/048

See application file for complete search history.

(56) References Cited

FOREIGN PATENT DOCUMENTS

| | | |
|---|---|---|
| KR | 10-2012-0131663 | 12/2012 |
| KR | 10-2014-0066392 | 6/2014 |
| KR | 10-2014-0075416 | 6/2014 |
| KR | 10-2014-0093505 | 7/2014 |
| KR | 10-2014-0108928 | 9/2014 |

OTHER PUBLICATIONS

International Written Opinion and Search Report dated Jul. 16, 2015 issued in Application No. PCT/KR2014/012212 (with English Translation).

\* cited by examiner

<restart after swap>

FIG. 15

| memory capability priority \ application priority | information on whether or not application is recently used | use frequency |
|---|---|---|
| memory 1 | application 4 ||
| memory 3 | application 1 ||
| memory 2 | application 5 ||
| ⋮ | ⋮ ||

METHOD FOR CONTROLLING DEVICE INCLUDING AT LEAST ONE MEMORY, AND SMART TV

CROSS-REFERENCE TO RELATED PATENT APPLICATIONS

This application is a U.S. National Stage Application under 35 U.S.C. § 371 of PCT Application No. PCT/KR2014/012212, filed Dec. 11, 2014, which claims priority to Korean Patent Application No. 10-2014-0160640, filed Nov. 18, 2014, whose entire disclosures are hereby incorporated by reference.

TECHNICAL FIELD

The present invention relates to an overall technology for managing a memory. More particularly, the present invention can be applied to a device including at least one memory or a smart TV including a kernel memory.

BACKGROUND ART

As a cable TV and an IPTV appear, a VOD (video on demand) service is activated and a technology is developing in a direction in which a bidirectional service is partly feasible. Yet, a bidirectional service of a PC level was impossible. In order to overcome the problem, a smart TV has been introduced.

A smart TV is able to install various applications by combining an internet access function with a legacy TV. The smart TV corresponds to a multi-functional television capable of providing various functions including web surfing, VOD watching, SNS service, game, and the like. In some cases, the smart TV is also referred to as a hybrid TV, and the like.

Recently, due to the development of various applications, the number of applications processed by the smart TV at the same time and the needs of a user are on the rise. Yet, since a legacy smart TV does not have a technology for performing backup (or, swap) in an application unit, if an external memory connected to the legacy smart TV for the use of backup (or, swap) is separated from the legacy smart TV, it is necessary to execute a corresponding application again from the beginning. As a result, it is natural that data processing speed is delayed.

DISCLOSURE OF THE INVENTION

Technical Tasks

A technical task of the present invention is to enhance multitasking speed by performing selective backup on a backup (or, swap) application according to a page corresponding to a specific application.

Another technical task of the present invention is to define a solution for performing backup on a specific application to a specific memory when there exist two or more memories used for backup.

The other technical task of the present invention is to provide a technology for more easily providing identification information on an application becoming a target of backup (or, swap) and a memory to a user.

Technical Solution

To achieve these and other advantages and in accordance with the purpose of the present invention, as embodied and broadly described, according to one embodiment, a smart TV includes a remote controller interface configured to receive a signal for executing at least one application, a display module configured to output video data of the executed application, a speaker configured to output audio data of the executed application, a kernel memory configured to temporarily store the executed application, a memory interface module configured to be connected with at least one external memory, and a memory controller configured to swap a page corresponding to a specific application among at least one application stored in the kernel memory to the external memory.

To further achieve these and other advantages and in accordance with the purpose of the present invention, according to a different embodiment, a method of controlling a device including at least one memory, includes the steps of receiving a signal for executing at least one application from a remote controller, outputting video data and audio data of the executed application, temporarily storing the executed application in an internal memory, swapping a page corresponding to a specific application among at least one application stored in the internal memory to an external memory, and displaying information on an application swapped to the external memory.

Advantageous Effects

According to one embodiment of the present invention, it is able to enhance multitasking speed by performing selective backup on a backup (or, swap) application according to a page corresponding to a specific application.

According to a different embodiment of the present invention, it is able to define a solution for performing backup on a specific application to a specific memory when there exist two or more memories used for backup.

According to a further different embodiment of the present invention, it is able to more easily provide identification information on an application becoming a target of backup (or, swap) and a memory to a user.

DESCRIPTION OF DRAWINGS

FIG. 15 is a diagram of a database defined for assigning priority according to a memory/application when a device is connected with two or more memories used for swapping according to a different embodiment of the present invention;

BEST MODE

Hereinafter, preferred exemplary embodiments of the present specification that can best carry out the above-described objects of the preset specification will be described in detail with reference to the accompanying drawings. It will be apparent that the technical scope and spirit of the present specification will not be limited only to the exemplary embodiments set forth herein.

In addition, although the terms used in the present specification are selected from generally known and used terms, the terms used herein may be varied or modified in accordance with the intentions or practice of anyone skilled in the art, or along with the advent of a new technology. Alternatively, in some particular cases, some of the terms mentioned in the present specification may be selected by the applicant at his or her discretion, the detailed meanings of which are described in relevant parts of the description herein. Furthermore, it is required that the present specification is understood, not simply by the actual terms used but by the meaning of each term lying within.

Figure 1:
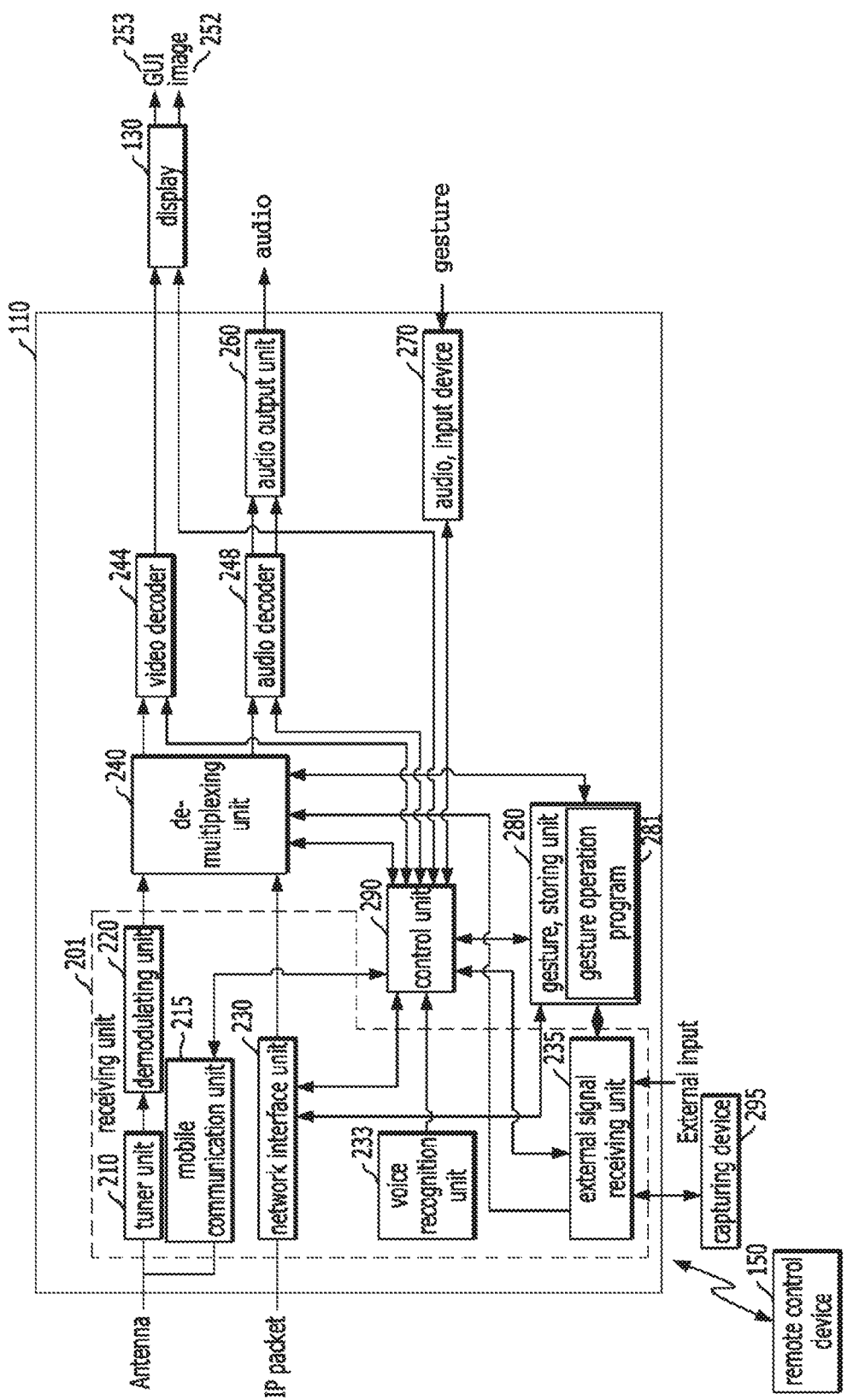
FIG. 1 is a diagram for configuration elements of a device according to one embodiment of the present invention.

FIG. 1 is a diagram for configuration elements of a device according to one embodiment of the present invention.

As shown in FIG. 1, a device 110 according to one embodiment of the present invention can include at least one selected from the group consisting of a receiving unit 201, a de-multiplexing unit 240, a video decoder 244, an audio decoder 248, an audio output unit 260, an input device 270, a storing unit 280, and a control unit 290. Depending on an embodiment, the device 110 can include a capturing device 295. And, the device 110 can include a display 130.

The receiving unit 201 can include broadcast data, image data, audio data, information data, and application data. The image data may correspond to image data for displaying 2D image and image data for displaying 3D image. The 3D image can include at least one of a hologram and a stereo image. The hologram may correspond to a CGH (computer-generated hologram).

The receiving unit 201 can include a tuner unit 210, a demodulating unit 220, a mobile communication unit 215, a network interface unit 230, a voice sensing unit 233, and an external signal receiving unit 235. The tuner unit 210 can receive a stream signal including data via a broadcast network and the demodulating unit 220 demodulates the received stream signal. The tuner unit 210 can include two tuners and one of the tuners receives a real time broadcasting program of a displayed channel. Another tuner receives a real time broadcasting program of each channel while continuously switching channels. The control unit 290 generates a still image or a thumbnail using the received real time broadcasting program and controls the generated still image or the thumbnail to be stored in the storing unit 280.

The mobile communication unit 215 can receive data via such a mobile communication network as a 2G communication network, a 3G communication network, a 4G communication network, and the like. The network interface unit 230 can transmit and receive an IP packet via a network and the external signal receiving unit 230 can receive an application and content from an external device and receive an image frame from the capturing device 295. In this case, the image frame may correspond to an image frame captured by a user.

The de-multiplexing unit 240 de-multiplexes a stream signal outputted by the demodulating unit 220 to a video signal and an audio signal. And, the de-multiplexing unit 240 can receive image data, audio data, broadcast data, information data, and application data from the mobile communication unit 215, the network interface unit 230, and the external signal receiving unit 235.

The video decoder 244 decodes a video signal de-multiplexed by the de-multiplexing unit 240 and outputs the decoded video signal to the display 130.

The audio decoder 248 decodes an audio signal de-multiplexed by the de-multiplexing unit 240 and outputs the decoded audio signal to the audio output unit 260.

The audio output unit 260 receives audio data from the audio decoder 248 and the control unit 290 and can output sound 261 by playing the received audio data.

The input device 270 may correspond to a touch screen, which is deployed to the display 130 or the front of the display, or a communication unit for receiving a signal from a remote control device 150. The input device 270 can receive a signal transmitted by the remote control device 150.

Depending on a certain embodiment, the receiving unit 201 may correspond to a communication unit for receiving a signal from the remote control device 150. In particular, the external signal receiving unit 235 can receive a signal transmitted from the remote control device 150.

In general, the storing unit 280 provides a place in which a program code and data used by the device 110 are stored. In this case, the program code may correspond to a program code of an application received by the receiving unit 201 and a program code of an application which is stored at the time of manufacturing the device 110. The application can be written by such a programming language as HTML, XML, HTML5, CSS, CSS3, Java Script, Java, C language, C++, Visual C++, C#, and the like. The storing unit 280 can store still images or thumbnails of channels on which a real time broadcasting program is on air. The still images and the thumbnails stored in the storing unit can be updated by a still image or a thumbnail which is generated using a real time broadcasting program broadcasted on a corresponding channel.

The storing unit 280 can be implemented by a ROM (read only memory), a RAM (random access memory), a hard disk drive, or the like. A program code and data may exist in a detachable storing media and can be loaded or installed in the device 110 when necessary. In this case, the detachable storing media can include a CD-ROM, a PC-CARD, a memory card, a floppy disk, a magnetic tape, and a network component.

The control unit 290 executes a command and performs an operation associated with the device 110. For example, the control unit 290 can control the device 110 to input and output between components and receive and process data using a command searched from the storing unit 280. The control unit 290 can execute a command associated with information included in transmission received from the remote control device 150.

The control unit 290 executes a program code together with an operating system and performs an operation of generating and using data. Since the operating system is generally well-known to the public, the operating system is not explained in detail at this time. For example, the operating system may correspond to Window system OS, Unix, Linux, Palm OS, DOS, Android, Macintosh, and the like. The operating system, other computer code, and data may exist in the storing unit 280 which operates in a manner of being connected with the control unit 290.

The control unit 290 can be implemented on a single chip, a plurality of chips, or a plurality of electronic parts. For example, various architectures including a dedicated or embedded processor, a single-purpose processor, a controller, ASIC, and the like can be used for the control unit 290.

The control unit 290 recognizes a user action and may be able to control the device 110 based on the recognized user action. In this case, the user action can include selection of a physical button of a device or a remote control device, execution of a prescribed gesture or selection of a soft button on a touch screen display, execution of a prescribed gesture recognized from an image captured by a capturing device 295, and execution of a prescribed voice recognized by voice recognition. A gesture can include a touch gesture and a spatial gesture.

The control unit 290 can check a user action sensed by the remote control device 150 based on information included in transmission received from the remote control device 150 and may be able to control the device 110 or the display 130 based on the user action checked by the control unit.

If the remote control device 150 senses a user action for requesting a search mode, the control unit 290 controls the device 110 to operate in the search mode.

In the search mode, if a user action for selecting an image or a part of the image included in contents displayed on the display 130 is sensed, the control unit 290 can provide a graphic feedback to a user to indicate that the image or a part of the image is selected in response to the user action. And, the control unit 290 can drag the image or a part of the image according to a movement of the remote control device.

The control unit 290 checks whether or not the image or a part of the image included in the contents displayed on the display 130 is dragged to a search window displayed on the display 130. If the image or a part of the image is dragged into the search window, the control unit 290 displays a plurality of search words associated with the image or a part of the image on the search window as recommended search words.

The control unit 290 can control the display 130 to transmit transmission for indicating to display an image 252 or GUI 253.

The input device 270 receives a gesture 271 and the control unit 290 executes commands to perform operations associated with the gesture 271. Moreover, the storing unit 280 can include an operating system or a gesture operating program 281 corresponding to a part of a separate application. In general, the gesture operating program 281 recognizes the occurrence of the gesture 271 and includes a series of commands to inform one or more software agents of the gesture 271 and/or action(s) to be performed in response to the gesture 271.

For example, the remote control device 150 corresponds to a remote controller and the device 110 can be referred to as an electronic device. More specifically, the device may correspond to a smart TV, and the like.

Figure 2:
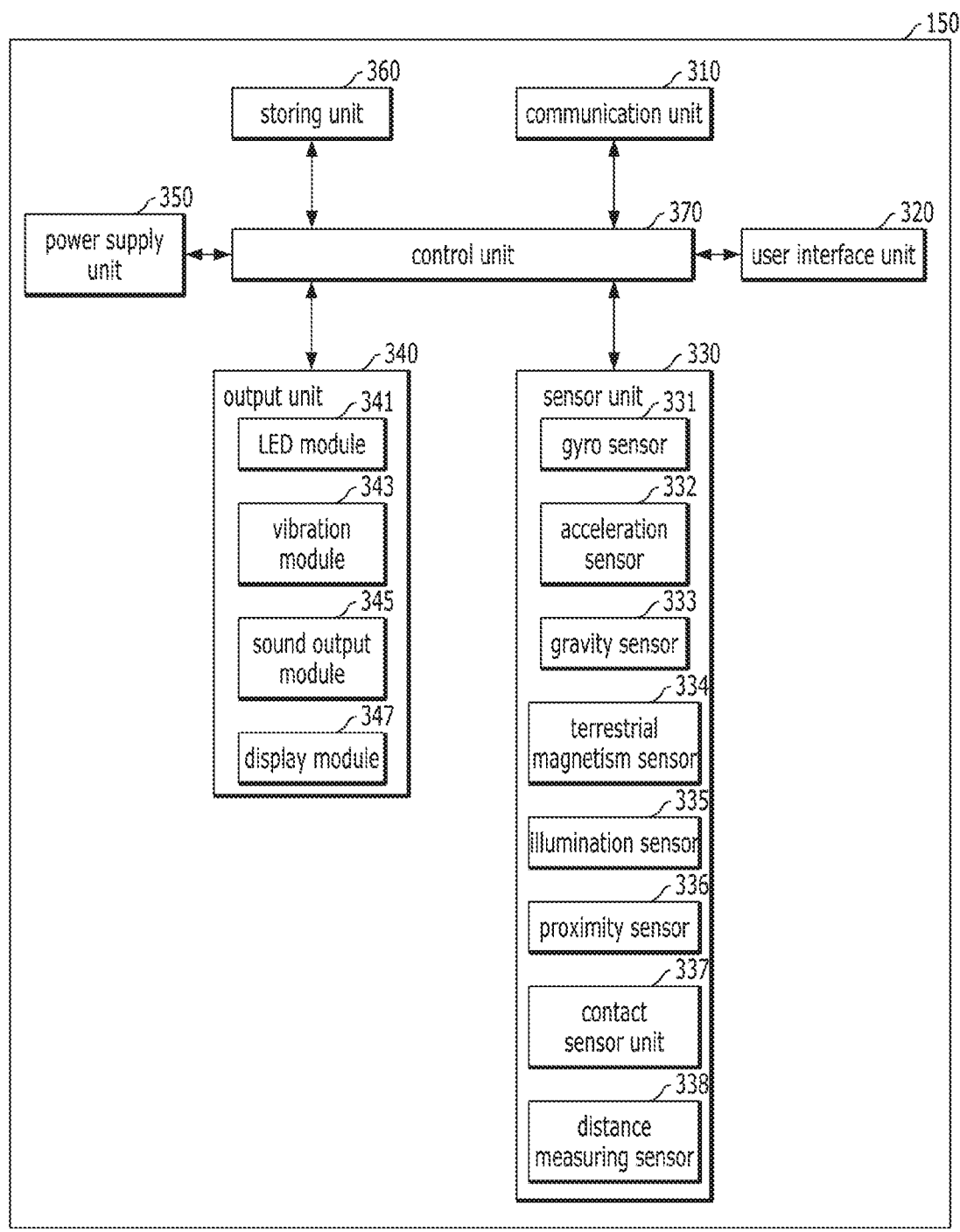
FIG. 2 is a diagram for configuration elements of a remote controller for controlling a device according to one embodiment of the present invention.

FIG. 2 is a diagram for configuration elements of a remote controller for controlling a device according to one embodiment of the present invention.

As shown in FIG. 2, the remote control device 150 can include at least one selected from the group consisting of a communication unit 310, a user interface unit 320, a sensor unit 330, an output unit 340, a power supply unit 350, a storing unit 360, a control unit 370, and a light emitting unit 380.

The communication unit 310 corresponds to a communication module providing a bidirectional omnidirectional (nondirectional) communication means and can perform radio communication with the electronic device 100 using a communication scheme according to a prescribed communication specification. In this case, the communication specification may correspond to Zigbee, Bluetooth, UWB (ultra wideband), RFID (radio frequency identification), or wireless LAN. The communication unit 310 can transmit a control signal to an electronic device or the device 110. In this case, the control signal may correspond to a signal including information on a movement of the remote control device 150, and the like, or a signal indicating a command to be performed in the electronic device 110. And, the control signal can include a control signal corresponding to a sensed user action. The control signal can be generated based on a point of the user interface unit 320 at which a contact is sensed and a control mode. In this case, the use action can include selection of a physical button of a remote control device, a movement of the remote control device, execution of a prescribed gesture or selection of a soft button on an interface provided by the user interface unit 320.

The control unit 370 can control various matters related to the control of the remote control device 150. The control unit 370 can control the communication unit 310 to transmit an RS signal including a control signal. The control unit 370 can control the communication unit 310 to receive a signal transmitted by the electronic device 110.

The control unit 370 receives a sensor signal from the sensor unit 330. The sensor signal is generated based on at least one selected from the group consisting of a position, a direction, a movement, and a contact of the remote control device 150.

The control unit 370 receives a sensor signal indicating a movement of the remote control device 150 from the sensor unit 330 and receives a user action from the user interface unit 320. The control unit 370 can generate a data packet including information on the movement indicated by the received sensor signal and a control signal associated with the received user action and can control the generated data packet to be transmitted to the electronic device 110.

The user interface unit 320 provides an interface for controlling the electronic device 110 or the display 130 and senses a user action performed on the provided interface. The user interface 320 can be configured by a keypad, a button, a touchpad, a touch screen, and the like. A user can input a command for controlling the electronic device 110 or the display 130 to the remote control device 150 by operating the user interface unit 320.

The user interface unit 320 includes a first button and a second button respectively deployed to a different side and can sense a user action inputted on at least one of the first button and the second button. As an embodiment, the first button can be deployed to the rear side of the remote control device 150 and the second button can be deployed to the front side of the remote control device 150. And, a different button may not be deployed to a side to which the first button is deployed and a different button can be deployed to a side to which the second button is deployed. In the following, the first button and the second button are referred to as a grab button and an OK button, respectively.

The grab button can be used for the usage of grabbing or touching a screen of the display 130 or a graphic object displayed on a screen of the display 130. For example, if a user pushes the grab button, the electronic device 110 or the display 130 recognizes it as a user touches the screen of the display 130 and may be able to provide a feedback on the touch. The feedback may correspond to at least one selected from the group consisting of a visual feedback, an auditory feedback, and a tactile feedback.

The OK button can be used for the usage of selecting a graphic object at which a graphic pointer is located on a screen of the display 130 or a menu item. In this case, the graphic pointer can also be referred to as a pointer.

In case of selecting a graphic object, there is a difference between the grab button and the OK button in that the grab button selects a specific graphic object irrespective of a position of a pointer, whereas the OK button selects a specific graphic object in association with a position of a graphic pointer.

The control unit 370 generates a down signal of the grab button in response to a user action pushing the grab button and generates a down signal of the OK button in response to a user action pushing the OK button. The control unit 370 generates an up signal of the grab button in response to a user action releasing the grab button and generates an up signal of the OK button in response to a user action releasing the OK button. The control unit 370 can control the down signal and the up signal of the grab button and the down signal and the up signal of the OK button to be transmitted to the electronic device 110 or the display 130. In this case, the down signal and the up signal of the grab button and the down signal and the up signal of the OK button can be transmitted at the same time or individually. And, the down signal and the up signal of the grab button and the down signal and the up signal of the OK button can be transmitted together with movement information of the remote control device 150 at the same time or individually.

The sensor unit 330 generates a sensor signal based on at least one selected from the group consisting of a position, a direction, a movement, and a contact of the remote control device. The sensor unit 330 can include at least one selected from the group consisting of a gyro sensor 331, an acceleration sensor 332, a gravity sensor 333, a terrestrial magnetism sensor 334, an illumination sensor 335, a proximity sensor 336, a contact sensor unit 337, and a distance measuring sensor 338.

The gyro sensor 331 senses a movement of the remote control device 150 and can generate a sensor signal indicating the sensed movement. For example, the gyro sensor 331 senses the movement of the remote control device 150 on the basis of x, y, and z axis and can generate a sensor signal indicating a spatial vector based on a sensed result.

The acceleration sensor 332 senses a moving speed of the remote control device 150 and can generate a sensor signal indicating the sensed moving speed.

The gravity sensor 333 senses the top and the bottom of the remote control device 150 using the earth's gravity and can generate a sensor signal indicating a direction of the remote control device 150.

The terrestrial magnetism sensor 334 senses a direction of the remote control device 150 using terrestrial magnetism of the earth and can generate a sensor signal indicating the sensed direction.

The illumination sensor 335 senses illumination near the remote control device 150 and can generate a sensor signal indicating the sensed illumination.

The proximity sensor 336 senses an object approaching to the remote control device 150 and can generate a sensor signal indicating a sensed result.

The contact sensor 337 senses a contact of the remote control device 150 and can generate a sensor signal indicating a sensed result.

The distance measuring sensor 338 senses a distance from the electronic device 110 and can generate a sensor signal indicating the sense distance.

The output unit 340 can output at least one selected from the group consisting of an image signal, an audio signal, an optical feedback, and a haptic feedback in response to a user action sensed by the user interface unit 320 or a signal transmitted by the electronic device 110. The output unit 340 can include at least one selected from the group consisting of an LED module 341 configured to be turned on when the user interface 320 is operated or a signal is transceived between the communication unit 310 and the electronic device 110, a vibration module 343 configured to generate vibration, a sound output module 345 configured to output sound, and a display module 347 configured to output an image.

The power supply unit 350 supplies power to the remote control device 150. If the remote control device does not move for a prescribed time, the power supply unit 350 stops supplying power to the remote control device 150 to reduce power waste. If a prescribed key mounted on the remote control device 150 is operated, the power supply unit 350 may resume supplying power to the remote control device 150.

The storing unit 360 can store various programs, program data, and the like necessary for controlling or operating the electronic device 110. The storing unit 360 can store control data corresponding to a user action. The control unit 370 can access control data corresponding to a user action sensed by the user interface unit 320 from the storing unit 360 an can control a control signal including the accessed control data to be transmitted.

The storing unit 360 can store information on a frequency band. The remote control device 150 can transceive a signal with the electronic device 110 via a frequency band indicated by the stored information. The information on the frequency band can include information indicating a management-purpose frequency channel and information indicating a pairing frequency channel.

Figure 3:
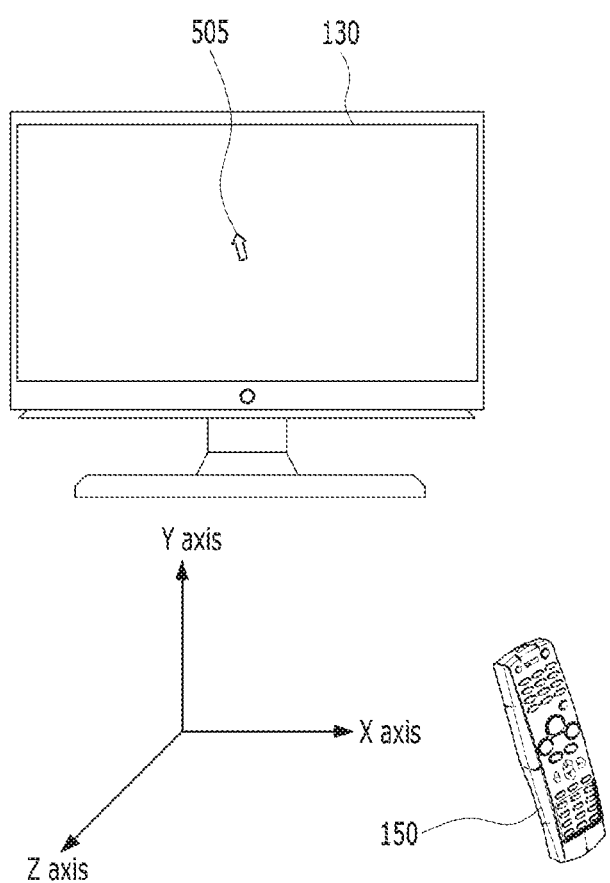
FIGS. 3 to 5 are diagrams for explaining a device which is controlled according to a motion of a remote controller according to one embodiment of the present invention.
Figure 4:
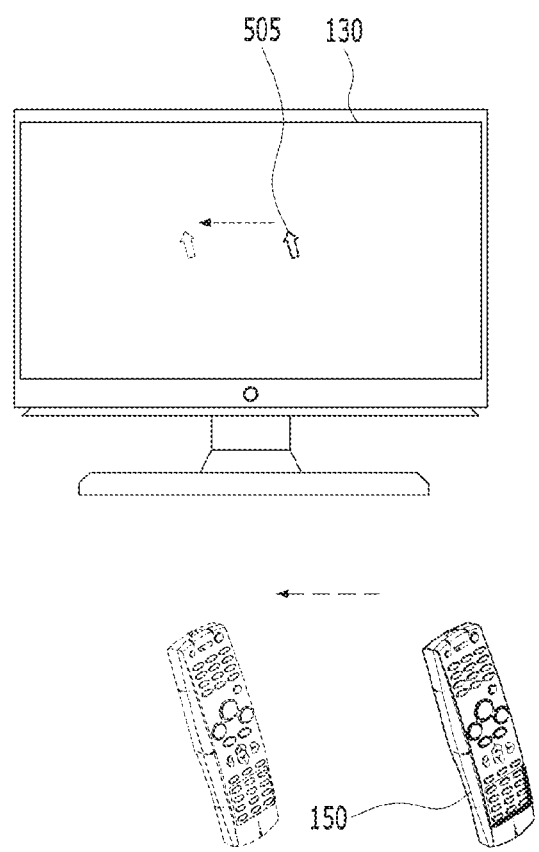
Figure 5:
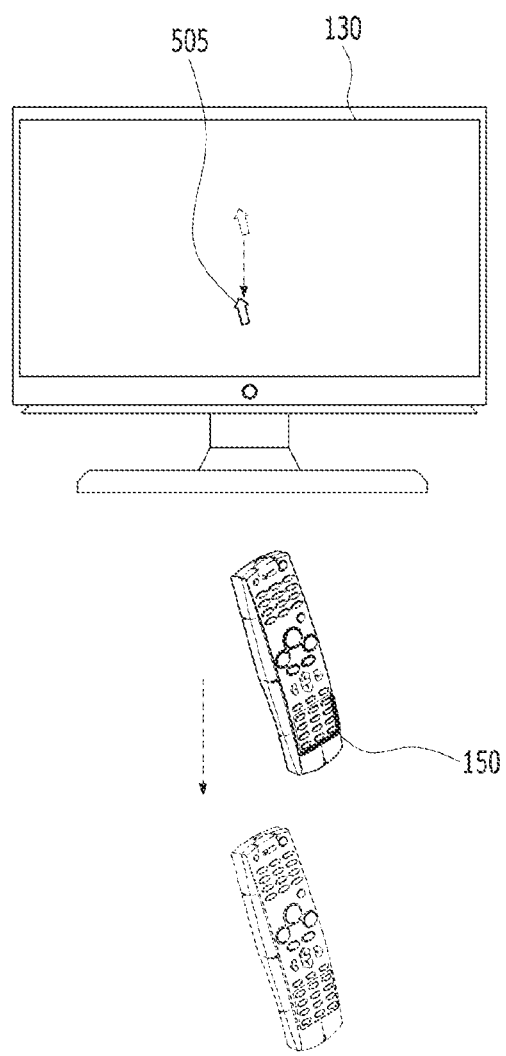

FIGS. 3 to 5 are diagrams for explaining a device which is controlled according to a motion of a remote controller according to one embodiment of the present invention.

As shown in FIG. 3, a display pointer 505 is displayed in the display 130.

A user can perform a user action for moving the remote control device 150 to the top and bottom, left and right (FIG. 4) and forward and backward (FIG. 5) or rotating the remote control device. In the following, in order to define a direction, an axis corresponding to a vertical axis of a screen 130 is defined as y axis, an axis corresponding to a horizontal axis of the screen 130 is defined as x axis, and an axis orthogonal to the screen 130 is defined as z axis. The movement of the remote control device 150 moving in up/down direction corresponds to a movement in the y axis, the movement of the remote control device 150 moving in left/right direction corresponds to a movement in the x axis, and the movement of the remote control device 150 moving forward/backward corresponds to a movement in the z axis.

The display pointer 550 displayed on the display 130 may be able to move in response to the movement of the remote control device 150. As shown in the drawing, since the display pointer 505 is moved and displayed according to a movement in 3D space, the remote control device 150 can be referred to as a spatial remote controller or a magic remote controller. The display pointer 505 can move irrespective of whether or not a button on the remote control device 150 is pushed. As an embodiment, if a grab button and an OK button of the remote control device 150 are not pushed, the display pointer 505 may move according to the movement of the remote control device 150.

Referring to FIG. 4, if a user moves the remote control device 150 to the left, the display pointer 505 displayed on the display 130 also moves to the left in response to the movement of the remote control device.

Movement information corresponding to information on a movement of the remote control device 150 sensed by a sensor of the remote control device 150 is transmitted to the electronic device 110. The electronic device 110 can calculate coordinate of the display pointer 505 based on the information on the movement of the remote control device 150. The electronic device 110 can control the display pointer 150 to be displayed on a screen position corresponding to the calculated coordinate.

Meanwhile, a moving speed or a moving direction of the display pointer 505 may corresponds to a moving speed or a moving direction of the remote control device 150.

Meanwhile, in the present specification, a display pointer corresponds to an object displayed on the display 130 in response to an operation of the remote control device 150. Hence, an object of various shapes can be displayed as the display pointer 505 on the screen instead of an arrow shape shown in the drawing. For example, a point, a cursor, a prompt, a thick borderline can be displayed as the display pointer. When the display pointer 505 is displayed in response to a point among a horizontal axis and a vertical axis on the display 130, it may also be able to display the display pointer 505 in response to a plurality of pointers such as a line, a surface and the like.

Designing other embodiments shown in FIGS. 6 to 17 by modifying the aforementioned embodiments of FIGS. 1 to 5 also belongs to the scope of right of the present invention.

An embodiment of the present invention described in the following with reference to FIG. 6 relates to a technology of swapping an application to an internal or external memory in a process unit.

Meanwhile, swapping described in the present specification corresponds to a technique for performing backup on a part of contents of a memory to a different memory and the swapping is performed in a page (4 KB) unit corresponding to a minimum unit for managing a memory in kernel. Of course, in some cases, such a term as backup or paging is used instead of the swapping.

According to the related art, a page managed in a kernel memory is managed in a form of LRU (least recently used). In particular, swapping is performed on a least recently used page first. A technique for performing swapping in a process unit has not been discussed yet. Moreover, since an application is distinguished from each other according to a separate process, it is difficult to perform swapping (backup) in an application unit. Hence, if an external memory storing a swapping application is eliminated, the application is killed and it is necessary execute the application again from the begging.

In order to resolve the aforementioned problem, the present invention proposes a method of performing backup (swap) to a memory in an application unit. When a plurality of memories are used for the usage of swapping, the present invention proposes a method of swapping a specific application to a specific memory.

Since swapping is performed in an application unit, if a user reenters a swapping application, it may be able to reduce access time and it may expect an effect of extending a legacy memory. If information on the swapping (backup) application is displayed, it may be able to enhance multitasking performance as well.

A more detail implementation method is explained in the following with reference to FIGS. 6 to 17.

Figure 6:
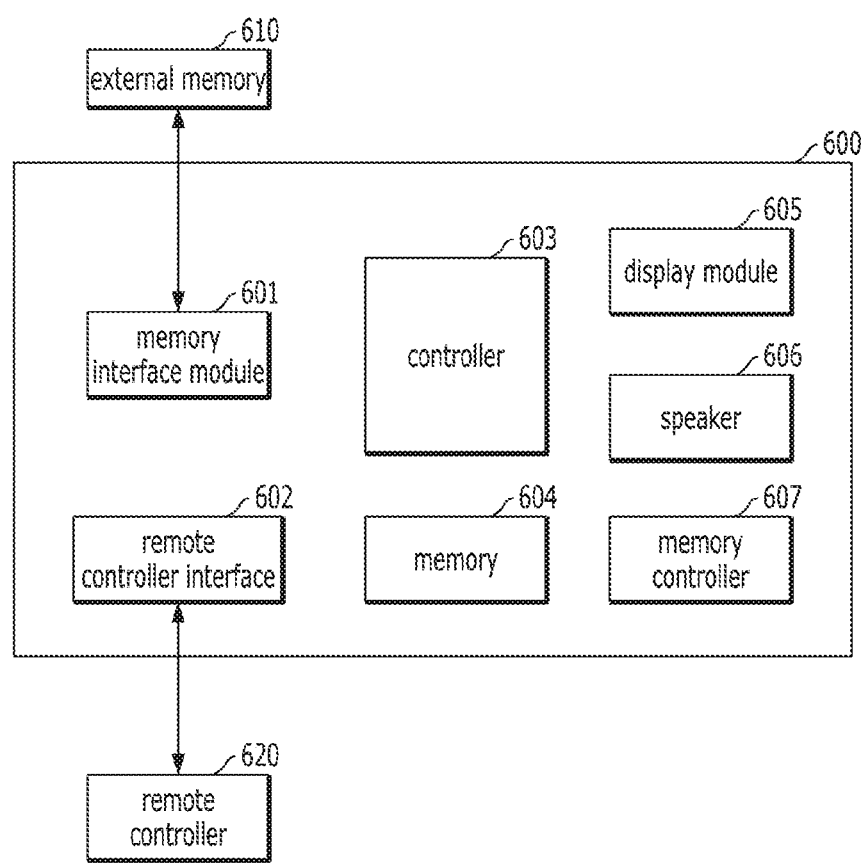
FIG. 6 is a diagram for configuration elements of a device according to a different embodiment of the present invention.

FIG. 6 is a diagram for configuration elements of a device according to a different embodiment of the present invention.

As shown in FIG. 6, a device 600 according to a different embodiment of the present invention can include a memory interface module 601, a remote controller interface 602, a controller 603, a memory 604, a display module 605, a speaker 606, and a memory controller 607. The device 600 can be controlled by the remote controller 620 mentioned earlier in the previous drawing. Moreover, for example, the device 600 corresponds to a smart TV and the memory 604 corresponds to a kernel memory.

The remote controller interface 602 receives a signal executing at least one application, the display module 605 outputs a video data of the executed application, and the speaker 606 outputs audio data of the executed application.

The memory 604 temporarily stores the executed application and the memory interface module 601 is configured to be connected with at least one external memory 610. There is no limit on the external memory 610 and there is no limit on the number of the external memory 610. Yet, for example, the external memory 610 corresponds to at least one selected from the group consisting of a HDD (hard disk drive), a USB (universal serial bus) memory, or a webhard.

The memory controller 607 is configured to swap a page corresponding to a specific application among at least one application stored in the kernel memory 604 to the external memory 610. Regarding this, it shall be explained in more detail with reference to FIG. 8 in the following.

According to a further different embodiment of the present invention, if there are a plurality of external memories 610 connected via the memory interface module 601, the memory controller 607 is configured to determine an external memory becoming a target of swapping according to priority of an application. For example, the priority of the application is determined according to use frequency of an application or whether or not an application is recently used. Regarding this, it shall be explained with reference to FIG. 15 in the following.

Moreover, according to a further different embodiment of the present invention, the display module 605 displays a graphic image corresponding to a currently executed application and an indicator for identifying an external memory to which an application is swapped. And, the display module 605 outputs a first message for guiding the existence of an application swapped to the external memory 610 or a second message for inquiring of the user about whether to swap to a different external memory or an internal memory, before the memory interface module 601 and the external memory 610 are disconnected. Regarding this, it shall be explained later with reference to FIGS. 13 and 14.

Figure 7:
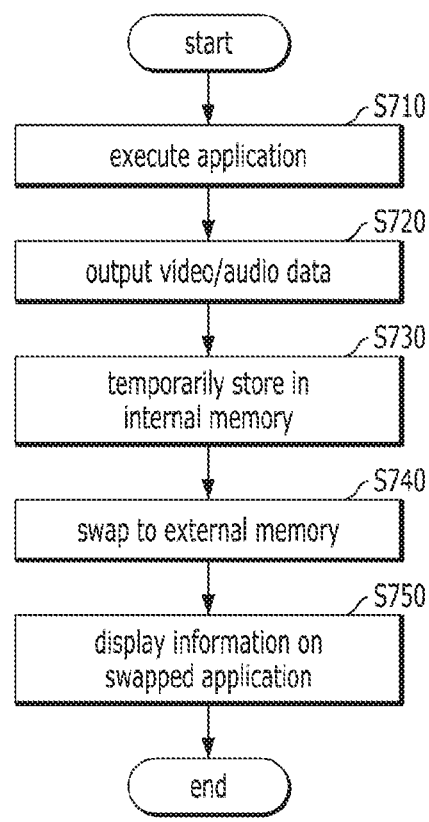
FIG. 7 is a flowchart for a method of controlling a device according to a different embodiment of the present invention.

FIG. 7 is a flowchart for a method of controlling a device according to a different embodiment of the present invention. FIG. 7 can be complementarily comprehended with reference to the aforementioned FIG. 6. As shown in FIG. 7, the embodiments of the present invention can also be applied to a technical field not restricted to a smart TV or a kernel memory.

A method of controlling a device according to a different embodiment of the present invention includes the steps of receiving a signal for executing at least one application from a remote controller [S710], outputting video data and audio data of the executed application [S720], temporarily storing the executed application in an internal memory [S730], swapping a page corresponding to a specific application among at least one application stored in the internal memory to an external memory [S740], and displaying information on the application swapped to the external memory [S750].

According to a further different embodiment of the present invention, the step S570 further includes the step of displaying a graphic image corresponding to a currently executed application and an indicator for identifying an external memory to which each application is swapped.

Moreover, the step S570 further includes the step of displaying at least one of a first message for guiding the existence of an application swapped to the external memory and a second message for inquiring of the user about whether to swap to a different external memory or an internal memory before the external memory is disconnected.

Although it is not depicted in FIG. 7, if a plurality of external memories are connected with the device, it may further include the step of determining an external memory becoming a target of swapping according to priority of an application. For example, the priority of the application is determined according to use frequency of an application or whether or not an application is recently used.

The internal memory corresponds to a kernel memory and the external memory corresponds to a webhard connected via a network interface, by which the present invention may be non-limited.

Figure 8:
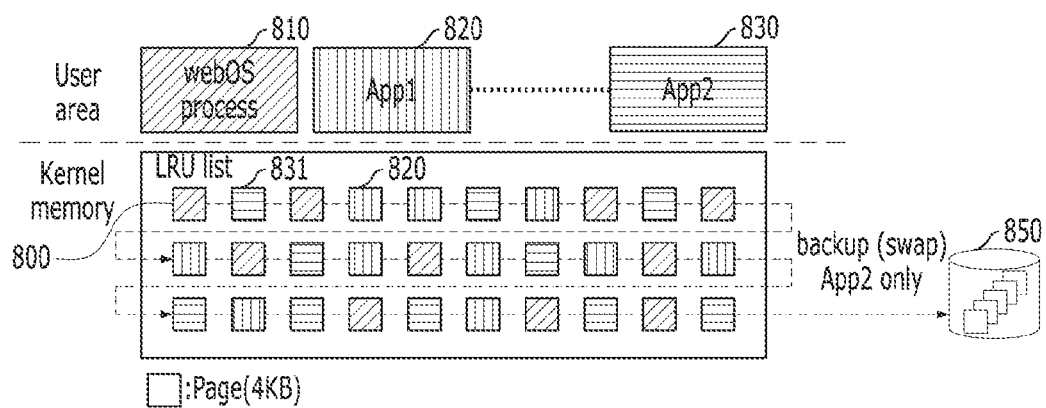
FIG. 8 is a diagram of a procedure for a device to perform selective backup on a page of a specific application only according to a different embodiment of the present invention.

FIG. 8 is a diagram of a procedure for a device to perform selective backup on a page of a specific application only according to a different embodiment of the present invention.

As mentioned in the foregoing description, according to the related art, backup (swap) is performed in a page (4 KB) unit in a kernel memory. In particular, according to the related art, since a process (or, application) corresponding to a specific page is not specified, if a memory is not sufficient, backup is sequentially performed from the earliest used page in LRU (least recently used) list. Hence, if a storing device being backed up (swap) is eliminated, it is highly probable to loss data of all applications and processes.

On the contrary, according to a different embodiment of the present invention, as shown in FIG. 8, it is able to configure selective backup (swap) to be performed on a page of a specific application only in a kernel memory.

For example, as shown in FIG. 8, assume that a user executes a web OS, a first application 820, and a second application 830 in a user area.

In this case, according to the related art, a page 811 corresponding to the web OS 810, a page 821 corresponding to the first application 820, and a page 831 corresponding to the second application 830 are mixed in the kernel memory and an earlier page in LRU (least recently used) list is swapped to a storing device 850 first.

On the contrary, according to one embodiment of the present invention, a page is swapped to the storing device 850 in an application unit instead of an earlier used page. In particular, referring to FIG. 8, pages 830 corresponding to the second application 830 are swapped to the storing device only. Hence, although the storing device 850 is eliminated, since data on the second application 830 is killed only, processes for the web OS and the first application are not killed.

Meanwhile, the storing device 850 applicable to the present invention can be applied to both a memory externally connected with a smart TV and an internal memory.

For example, examples of the storing device 850 include an eMMC (embedded multimedia card) memory, a HDD (hard disk driver) memory, a USB (universal serial bus) memory, NAS (network attached storage), webhard, and the like. Meanwhile, the NAS corresponds to a storage device for sharing a file system service and a storage service in a manner of being integrated with an open system server. It may be able to access data via a shared IP network and a unique IP address is assigned to each NAS device.

For example, the webhard corresponds to an internet file management system capable of storing, reading, and editing a document or a file written by a user and sharing the document or the file with a plurality of users together with Internet environment without a diskette by securing a storage corresponding to a storing space of a prescribed capacity.

Moreover, the present invention can be applied to all digital devices including a smart TV. In particular, the present invention can be applied to a web OS-based smart TV configured to process various applications. The web OS may correspond to an operating system operating in Linux kernel.

Figure 9:
FIG. 9 is a diagram for application execution timing when a swap technology is not applied.
Figure 10:
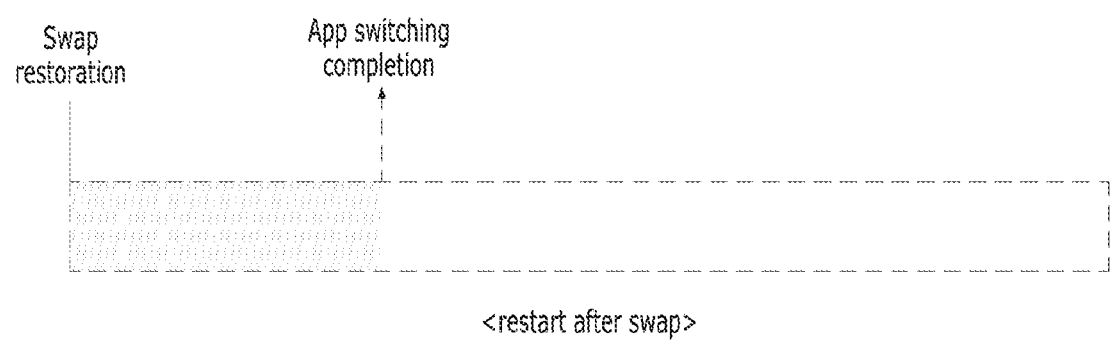
FIG. 10 is a diagram for application execution timing when a swap technology is applied.

FIG. 9 is a diagram for application execution timing when a swap technology is not applied and FIG. 10 is a diagram for application execution timing when a swap technology is applied.

One of the main advantages of the aforementioned web OS is able to support multitasking for various CPs (content providers) and web applications. Hence, the application unit swap technology of the present invention is absolutely necessary.

If a memory is not sufficient or connection of a memory to which an application is swapped is disconnected, the application is killed. In this case, as shown in FIG. 9, the application should be restarted. Hence, time about 5 to 10 seconds is taken for switching between applications and it may cause overall system delay.

On the contrary, according to the embodiments of the present invention, since an application is swapped to a random memory, as shown in FIG. 10, time taken for switching a task between applications is very fast less than 1 second. In particular, since swapping (backup) is performed on a random application, it is not necessary to perform a runtime processing shown in FIG. 9 according to an application.

Of course, it may consider adding a DDR SDRAM (double data rate synchronous dynamic random access memory) to a smart TV. However, a production cost increases geometrically and there is a limit on DDR SDRAM memory capacity capable of supporting multitasking. On the contrary, according to one embodiment of the present invention, if an internal memory is not sufficient, it is able to swap to an external memory in an application unit instead of an earlier used page, it has a merit in terms of cost. For example, a price of eMMC memory is relatively cheaper than a price of the DDR SDRAM memory.

Figure 11:
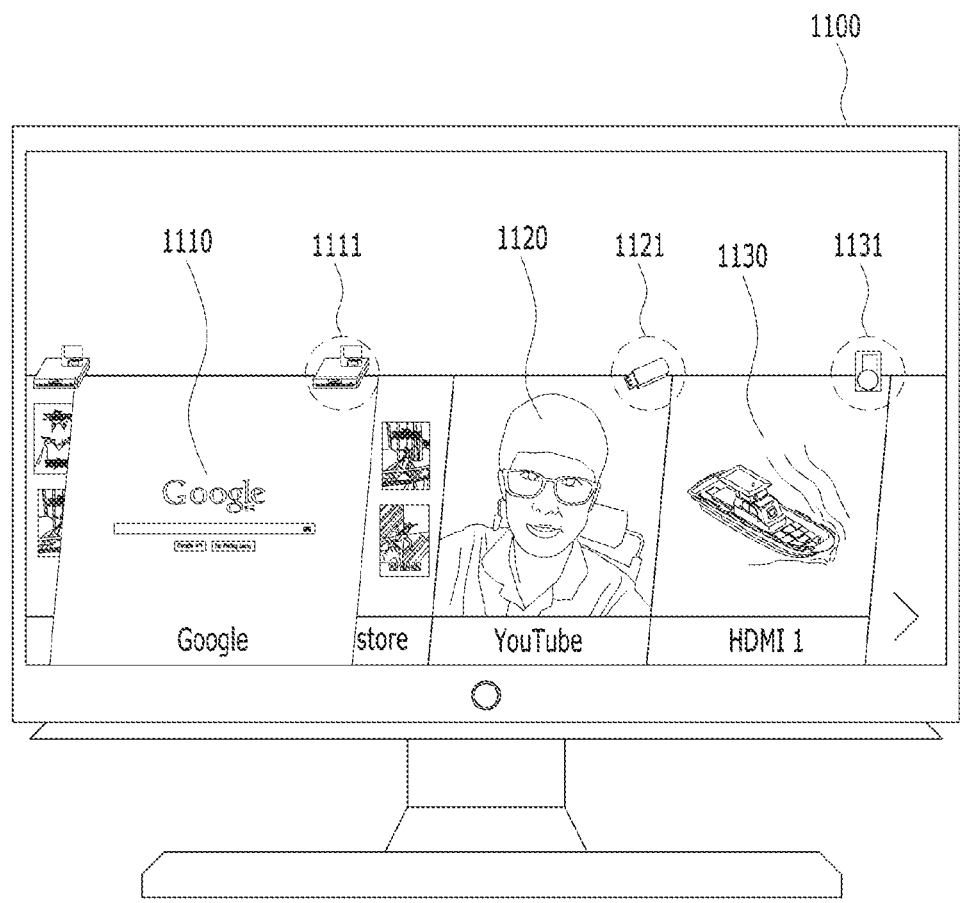
FIG. 11 is a diagram of a method for a device to indicate a swapping memory on the basis of an application according to a different embodiment of the present invention.

FIG. 11 is a diagram of a method for a device to indicate a swapping memory on the basis of an application according to a different embodiment of the present invention.

As shown in FIG. 11, a smart TV 1100 displays a list of recently used applications together with a broadcasting program. In particular, it is necessary to have a technology for mixing a graphic image of the list with a video data of the broadcasting program.

In particular, according to one embodiment of the present invention, it may be able to configure information on whether or not each application is swapped (backup) and a backup device to be displayed in an icon form on a recent list.

For example, as shown in FIG. 11, a graphic image 1110 indicating a first application and a graphic image 1111 indicating a memory to which the first application is swapped are displayed together on the recent list.

Moreover, a graphic image 1120 indicating a second application and a graphic image 1121 indicating a memory to which the second application is swapped are displayed together on the recent list.

And, a graphic image 1130 indicating a third application and a graphic image 1131 indicating a memory to which the third application is swapped are displayed together on the recent list.

And, as shown in FIG. 11, the graphic images 1111/1121/1131 used for identifying a memory are not identical to each other. A corresponding memory is similarly represented by each graphic image.

Hence, a user can selectively eliminate a specific memory in which a swapped application is temporarily stored. If the graphic images shown in FIG. 11 are provided, it is highly probable for the user to eliminate a memory to which an application capable of being immediately killed and not requiring fast access is swapped first.

Figure 12:
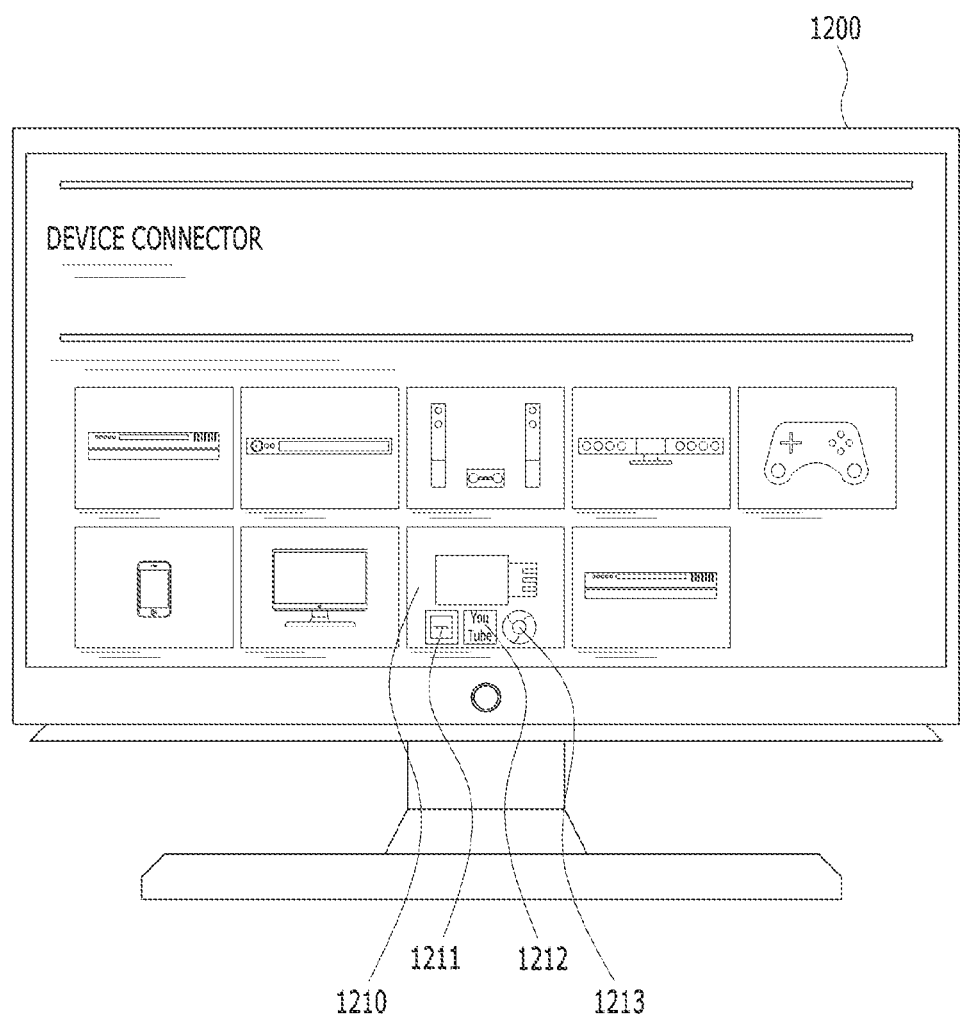
FIG. 12 is a diagram of a method for a device to indicate a swapping application on the basis of a memory according to a different embodiment of the present invention.

FIG. 12 is a diagram of a method for a device to indicate a swapping application on the basis of a memory according to a different embodiment of the present invention.

As shown in FIG. 12, a smart TV 1200 displays a list of currently connected external devices only or together with a broadcasting program. In particular, according to one embodiment of the present invention, a device list (device connector list) is configured to identify a type of an application swapped to an external memory.

For example, as shown in FIG. 12, a graphic image 1211 indicating a first application, a graphic image 1212 indicating a second application, and a graphic image 1213 indicating a third application swapped to a specific memory 1210 are displayed on a device list.

Hence, a user can selectively eliminate a specific memory in which a swapped application is temporarily stored. If the graphic images shown in FIG. 12 are provided, it is highly probable for the user to eliminate a memory to which an application capable of being immediately killed and not requiring fast access is swapped first.

Yet, it may consider a case of randomly eliminating a memory connected with a smart TV without using the process shown in FIGS. 11 and 12. In this case, a swapped application can be unintentionally killed. A solution for resolving the relevant problem is described in the following with reference to FIGS. 13 and 14.

Figure 13:
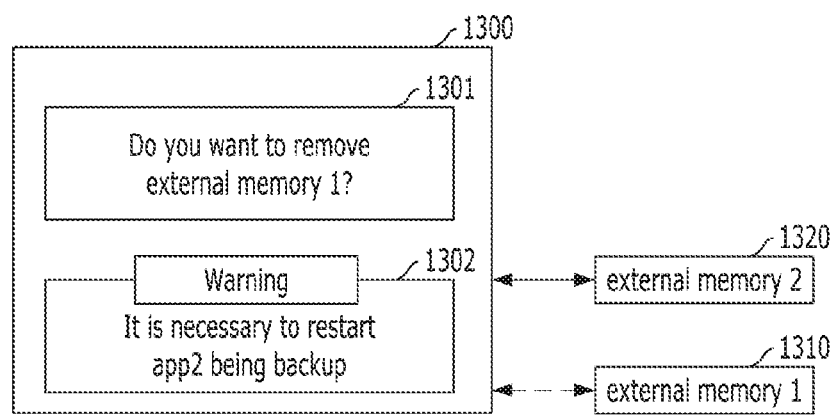
FIG. 13 is a diagram for an example of displaying a warning message by a device when a swapping memory is separated from the device according to a different embodiment of the present invention.

FIG. 13 is a diagram for an example of displaying a warning message by a device when a swapping (backup) memory is separated from the device according to a different embodiment of the present invention.

As shown in FIG. 13, assume that a smart TV 1300 is connected with a first external memory 1310 and a second external memory 1320. Moreover, assume that a second application is swapping (being backup) to the first external memory 1310.

If a user intends to eliminate the first external memory 1310 after such a function as "safely remove external device" is selected, the smart TV 1300 firstly displays a message 1301 to confirm whether or not the user intends to separate the first external memory from the smart TV.

If the user selects "YES" in the firstly displayed message 1310, according to the related art, the first external memory is immediately removed. On the contrary, according to one embodiment of the present invention, the smart TV 1300 secondly displays a warning message to inform the user that the second application being swapped is going to be restarted.

Hence, if guide messages shown in FIG. 13 are sequentially displayed, the user can finally determine an option between an option of using the first external memory for a different usage and an option of quickly accessing and executing the second application.

Figure 14:
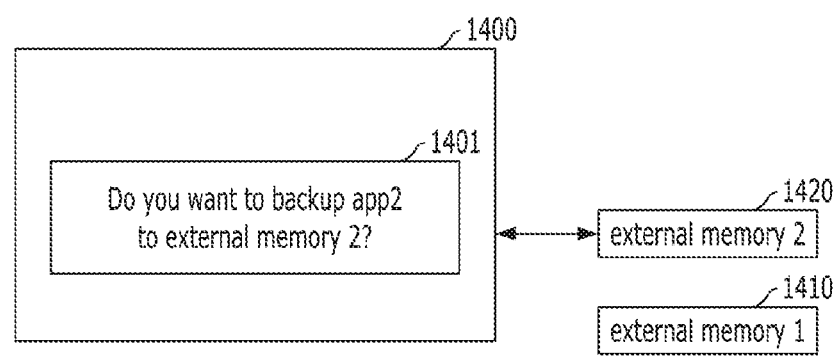
FIG. 14 is a diagram for a different example of displaying a warning message by a device when a swapping memory is separated from the device according to a different embodiment of the present invention.

FIG. 14 is a diagram for a different example of displaying a warning message by a device when a swapping (backup) memory is separated from the device according to a different embodiment of the present invention. FIG. 14 is explained on the premise of the aforementioned FIG. 13.

After the first message 1310 and the second message 1302 shown in FIG. 13 are displayed, according to a different embodiment of the present invention, as shown in FIG. 14, the smart TV 1400 outputs a third guide message 1401.

The third guide message 1401 should be displayed before the first external memory 1401 is removed. The third guide message 1401 corresponds to a graphic image necessary for inquiring of the user about whether to move the second application swapped to the first external memory 1410 to a second external memory 1420.

Of course, it may be able to automatically move an application, which is swapped to a memory disconnected from the smart TV, to a memory connected with the smart TV without outputting the third guide message 1401. This also belongs to the scope of right of the present invention.

FIG. 15 is a diagram of a database defined for assigning priority according to a memory/application when a device is connected with two or more memories used for swapping according to a different embodiment of the present invention.

Referring to FIG. 15, when a plurality of memories are connected with a smart TV, a database is necessary to determine a memory to which each of a plurality of applications is to be swapped. The database is included in an internal memory of the smart TV mentioned earlier in FIGS. 1 to 6.

First of all, the smart TV collects information on capability of each of a plurality of the memories. The capability of the memory may vary depending on capability information, processing speed information, and the like. Priority of the memory capability is determined based on at least one or more information.

Meanwhile, priority of an application currently executed by multitasking can be determined by at least one selected from the group consisting of information on whether or not the application is recently used, use frequency, and data capacity. For example, it may be able to configure an application having the biggest data capacity to be swapped to a memory of biggest capacity. Or, it may be able to configure a most frequently used application to be swapped to a memory of biggest capacity or a memory having fastest processing speed. This also belongs to a different scope of right of the present invention. In FIG. 15, assume that a first memory has top priority and a fourth application has top priority. Thus, the first memory is matched with the fourth application.

Figure 16:
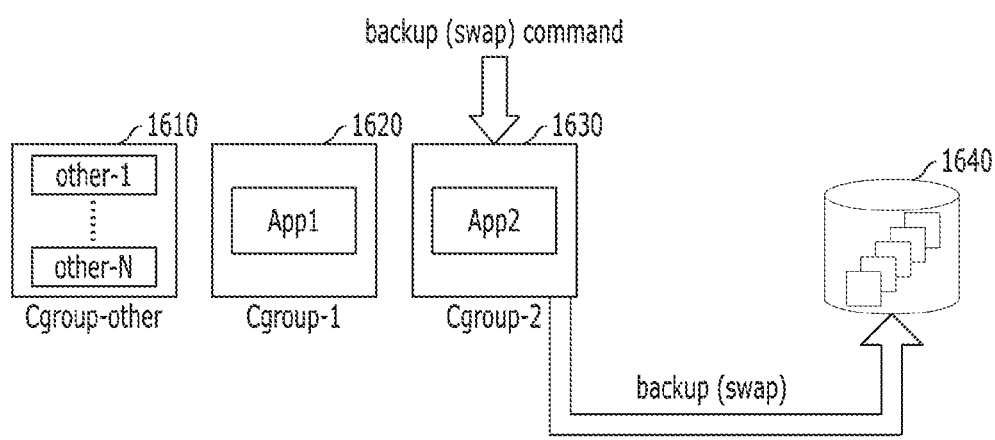
FIGS. 16 and 17 are diagrams of a process for a device to perform backup on an application in a kernel memory according to a different embodiment of the present invention.
Figure 17:
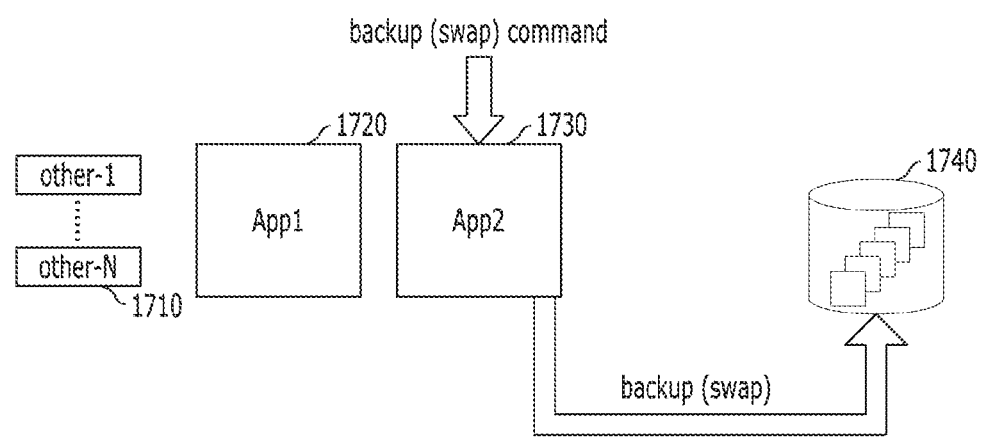

FIGS. 16 and 17 are diagrams of a process for a device to perform backup on an application in a kernel memory according to a different embodiment of the present invention. The swapping technology of the kernel memory shown in FIG. 8 can also be implemented by a further different embodiment shown in FIGS. 16 and 17.

As a further different embodiment of performing swapping (backup) in an application (or, process) unit in a kernel memory, the present invention proposes FIGS. 16 and 17.

As shown in FIG. 16, grouping is performed in an application unit 1610/1620/1630 in a kernel memory. If a swapping command is received on a specific application 1630, it may be able to configure the specific application 1630 to be swapped only to a connected memory 1640.

According to the related art, managing resources (memory, CPU, etc.) of the kernel is controlled under the assumption that the entire resources corresponds to a single group. On the contrary, according to one embodiment of the present invention, it may be able to control the resources by binding partial processes (applications) in a group unit. Hence, as shown in FIG. 16, it may be able to perform swapping in an application unit.

Moreover, as shown in FIG. 17, it may be able to swap a second application 1730 to an external memory 1740 only among random processes 1710/1720/1730 using Per Process Reclaim technique. For example, the Per Process Reclaim technique corresponds to a technique of retrieving all memories used by a specific process. In particular, if a device for retrieving memories is configured by the external memory 1740, it may be able to perform swapping in an application (process) unit.

According to one embodiment of the present invention, it is able to considerably reduce application reentry time via application backup and it may be able to reduce cost because DDR memory expansion is not necessary. And, it is able to provide user multitasking-related enhanced UX/UI by checking whether or not there is application backup.

The present specification can be implemented with a code readable by a computer in a recording media readable by the computer, which is equipped in a network device. Moreover, designing a code and a program to be downloaded in a corresponding device also belongs to the scope of the present invention.

The recording media readable by the computer may include all kinds of recording devices for storing data capable of being read by the computer. The examples of the recording media readable by the computer may include a ROM, a RAM, a CD-ROM, a magnetic tape, a floppy disc, an optical data storing device and the like. And, implementing in a form of a carrier wave such as a transmission via the internet and the like is also included in the recording media. And, since the recording media readable by the computer are distributed to the computers connected by a network, codes readable by the computer can be stored and executed in a manner of being distributed.

While the present specification has been described and illustrated herein with reference to the preferred embodiments thereof, it may be non-limited to the aforementioned specific embodiment and it will be apparent to those skilled in the art that various modifications and variations can be made therein without departing from the spirit and scope of the invention. Thus, it is intended that the technical idea and prospect of the present specification covers the modifications and variations of this invention.

MODE FOR INVENTION

Since the present invention is sufficiently explained in the best mode, those skilled in the art can implement the present invention in a different form.

INDUSTRIAL APPLICABILITY

The present invention is applicable to a device including at least one memory. For example, the present invention can be applied to a smart TV. Hence, it may expect industrial usability.

What is claimed is:

1. A television (TV) containing a kernel memory, comprising:
   a remote controller interface configured to receive a signal for executing at least one application;
   a display module configured to output video data of the executed application;
   a speaker configured to output audio data of the executed application;
   a kernel memory configured to temporarily store the executed application;
   a memory interface module configured to be connected with at least one external memory; and
   a memory controller configured to swap a page corresponding to a specific application among at least one application stored in the kernel memory to the external memory,
   wherein the display module is configured to:
      output a first message for guiding existence of the specific application swapped to the specific external memory when the remote controller interface receives a first user input for removing the specific external memory before the memory interface module and the external memory are disconnected,
      output a second message for inquiring a user about whether to swap to a different external memory or an internal memory when the remote controller interface receives a second user input for confirming disconnecting of the specific external memory,
   wherein the memory controller is configured to swap the page corresponding to the specific application to the different external memory or the internal memory when the remote controller interface receives a third user input for confirming swapping to the different external memory or the internal memory.

2. The TV of claim 1, wherein when a plurality of external memories are connected via the memory interface module, the memory controller is configured to determine an external memory becoming a target of swapping according to priority of an application.

3. The TV of claim 2, wherein the priority of the application is determined according to use frequency of the application or information on whether or not the application is recently used.

4. The TV of claim 1, wherein the display module is configured to display a graphic image corresponding to a currently executed application and an indicator for identifying an external memory to which each application is swapped.

5. The TV of claim 1, wherein the external memory corresponds to at least one selected from the group consisting of a HDD (Hard Disk Drive), a USB (Universal Serial Bus) memory, and a webhard.

6. A method of controlling a device containing at least one memory, comprising:
receiving a signal for executing at least one application from a remote controller;
outputting video data and audio data of the executed application;
temporarily storing the executed application in an internal memory;
swapping a page corresponding to a specific application among at least one application stored in the internal memory to an external memory;
displaying information on the specific application swapped to the external memory;
outputting a first message for guiding existence of the specific application swapped to the specific external memory when a remote controller interface receives a first user input for removing the specific external memory before the device and the external memory are disconnected;
outputting a second message for inquiring a user about whether to swap to a different external memory or the internal memory when the remote controller interface receives a second user input for confirming disconnecting of the specific external memory; and
swapping the page corresponding to the specific application to the different external memory or the internal memory when the remote controller interface receives a third user input for confirming swapping to the different external memory or the internal memory.

7. The method of claim 6, wherein the displaying displays a graphic image corresponding to a currently executed application and an indicator for identifying an external memory to which each application is swapped.

8. The method of claim 6, when a plurality of external memories are connected with the device, the method comprising determining an external memory becoming a target of swapping according to priority of an application.

9. The method of claim 8, wherein the priority of the application is determined according to use frequency of the application or information on whether or not the application is recently used.

10. The method of claim 6, wherein the internal memory corresponds to a kernel memory.

11. The method of claim 6, wherein the external memory corresponds to a webhard connected via a network interface.

* * * * *